United States Patent [19]

Hutchings et al.

[11] 4,011,670

[45] Mar. 15, 1977

[54] ROLLER MOUNTING

[75] Inventors: James P. Hutchings, Coal City; Jack H. Trittipoe, Elwood, both of Ill.

[73] Assignee: Caterpillar Tractor Co., Peoria, Ill.

[22] Filed: Apr. 9, 1975

[21] Appl. No.: 566,463

[52] U.S. Cl. .................. 37/126 R; 37/126 AE; 37/129; 74/242.16; 308/207 R
[51] Int. Cl.² .................. E02F 3/76; E02F 3/80
[58] Field of Search ..... 172/610; 37/126 R, 126 A, 37/126 AA, 126 AB, 126 AC, 126 AD, 126 AE, 129; 64/1 R, 1 S, 31; 74/242.16, 600; 280/105; 305/25, 52; 308/16, 18, 62, 207 R, 208, 215; 403/259; 85/32.1

[56] References Cited

UNITED STATES PATENTS

| 542,330 | 7/1895 | Bryden | 308/16 |
|---|---|---|---|
| 848,183 | 3/1907 | Luke | 308/18 |
| 1,616,578 | 2/1927 | Johnson | 308/207 R X |
| 1,832,382 | 11/1931 | Hall et al. | 74/600 X |
| 2,190,555 | 2/1940 | Toce et al. | 403/259 |
| 2,646,690 | 7/1953 | Crowther | 74/242.16 |
| 2,866,673 | 12/1958 | Van Der Knoop | 308/207 R |
| 3,064,487 | 11/1962 | Warrick et al. | 74/242.16 |
| 3,488,870 | 1/1970 | Holets et al. | 37/129 |
| 3,675,347 | 7/1972 | Siewert et al. | 37/129 |

Primary Examiner—Richard T. Stouffer
Attorney, Agent, or Firm—John W. Grant

[57] ABSTRACT

A roller mounting includes an elongated shaft having an end rotatably and slidably disposed within a bore formed in a mounting bracket, and a roller rotatably mounted on an eccentric portion provided on the other end of the shaft. The shaft is retained in the bore by a device which may be rotated in unison with the shaft to cause lateral movement of the roller relative to the bracket without imparting axial movement to the roller and which may be rotated relative to the shaft to cause axial movement of the shaft for moving the roller in an axial direction independently of the lateral adjustment.

4 Claims, 3 Drawing Figures

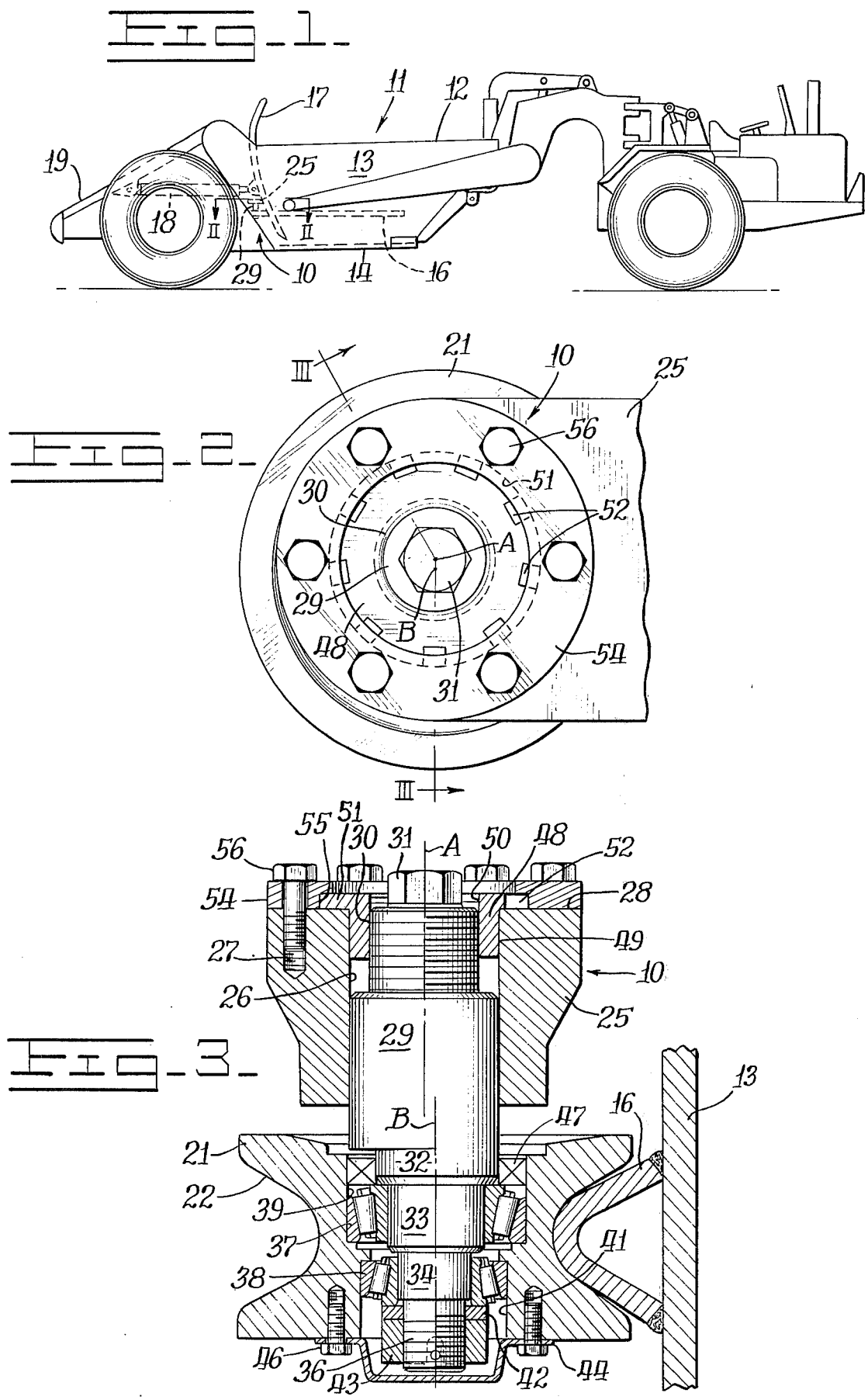

ROLLER MOUNTING

BACKGROUND OF THE INVENTION

Earthmoving scrapers commonly have an ejector disposed for fore and aft movement within the scraper bowl for selectively ejecting material therefrom. The efficiency of the ejector is determined in part by the amount of clearance between the ejector and the floor and sidewalls of the scraper bowl with the ejector normally being positioned by a plurality of rollers to maintain such clearance. One of the problems encountered with the roller supported ejector is that of initially centering and positioning the ejector within the scraper bowl to obtain the desired clearance to compensate for manufacturing tolerances and any subsequent readjustment of the ejector to compensate for wear and/or distortion of the ejector or bowl. Heretofore numerous sets of rollers, each roller of which is adjustable laterally relative to its axis, have been utilized with one set employed for adjusting the clearance between the ejector and the sidewalls while another set is employed to adjust the clearance between the ejector and floor. This unduly multiplies the number of rollers required as well as the number of rollers requiring periodic positioning to maintain the proper ejector clearance.

OBJECTS OF THE INVENTION

Accordingly, an object of this invention is to provide an improved roller mounting which provides both axial and lateral adjustment of the roller relative to a mounting bracket.

Another object of this invention is to provide such an improved roller mounting which permits the roller to be easily and independently adjusted in both the axial and lateral direction.

Other objects and advantages of the present invention will become more readily apparent upon reference to the accompanying drawings and following description.

BRIEF DESCRIPTION OF THE DRAWINGS

FIG. 1 is a side elevational view of a tractor-scraper illustrating one environment in which the roller mounting embodying the principles of the present invention is employed.

FIG. 2 is a plan view of the roller mounting arrangement as viewed in the direction of the arrows of line II—II of FIG. 1.

FIG. 3 is a cross sectional view taken along line III—III of FIG. 2.

DESCRIPTION OF THE PREFERRED EMBODIMENT

Referring more particularly to the drawings, a roller mounting arrangement embodying the principles of the present invention is generally indicated by the reference numeral 10 in association with an earthmoving tractor-scraper 11. The tractor-scraper includes a scraper bowl 12 which has a pair of opposing sidewalls, one of which is shown at 13, joined together at their lower edges by a floor 14. Each sidewall has an elongated guide member 16 secured to the inside surface thereof parallel to the floor with the guide member having a generally V-shaped cross section as more clearly shown in FIG. 3. An ejector 17 is disposed within the scraper bowl and adapted to be reciprocated therein by a hydraulic jack 18 having its rod end secured to the ejector and its head end secured to a scraper bowl frame 19. In the present invention a pair of the roller mounting arrangements are utilized individually to mount a pair of rollers, one shown at 21, to the rear of the ejector at opposite sides thereof. Each roller has a circumferential groove 22 formed therein having a V-shape to ride on the respective guide member for carrying the ejector as it is translated longitudinally through the scraper bowl.

The roller mounting arrangement 10 of the present invention includes a mounting bracket 25 secured to the rear of the ejector 17 elevationally above the roller 21. The mounting bracket has a bore 26 formed therein with the bore having an axis A disposed substantially perpendicular to the floor of the scraper bowl. A plurality of threaded holes, one shown at 27, are provided in an upper surface 28 of the mounting bracket. An elongated shaft 29 is slidably and rotatably disposed within the bore and has a longitudinal axis coinciding with the axis A of the bore. A reduced diameter threaded portion 30 and a slightly smaller hexagonal portion 31 are formed on the upper end of the shaft. A plurality of concentric reduced diameter portions 32, 33 and 34 and a threaded portion 36 are formed on the lower end of the shaft and have a common axis B radially offset from the longitudinal axis A of the shaft, thus forming an eccentric. The roller 21 is rotatably mounted to the reduced diameter portions 33 and 34 by a pair of bearings 37 and 38 disposed thereon and individually seated in a pair of bores 39 and 41 formed in the roller. The roller is retained on the shaft in an axial position relative thereto by a washer 42 and a nut 43 which is screw threaded onto the threaded portion 36. A cover 44 encloses the bottom of the roller and is secured thereto by a plurality of bolts 46. A seal 47 is seated within a bore 39 of the roller and seals against the reduced diameter portion 32.

A spanner nut 48 has an annular pilot portion 49 rotatably disposed within the bore 26 and contains a threaded bore 50 screw threadably attached to the threaded portion 30 of the shaft 29. The spanner nut has a radially outwardly extending flange 51 seated on the upper surface 28 and which includes a plurality of circumferentially spaced notches 52 formed therein. A locking ring 54, having a recess 55 formed therein to receive the flange of the nut, is releasably secured to the upper surface by a plurality of bolts 56. The bolts engage threaded holes 27 to selectively nonrotatably clamp the flange against the mounting bracket.

OPERATION

While the operation of the present invention is believed clearly apparent from the foregoing description, further amplification will subsequently be made in the following brief summary of such operation. The roller mounting 10 of the present invention is employed for adjusting the position of the ejector 17 both vertically and laterally within the scraper bowl 12 by axial and lateral adjustment of the roller 21 relative to the mounting bracket 25. Vertical adjustment is accomplished by loosening the bolts 56, and thus the locking ring 54, so that the pilot portion 49 of spanner nut 48 may be rotated within the bore 26. A suitable spanner wrench, not shown, is inserted into the notches 52 for rotating the spanner nut while a suitable socket wrench is placed on the hexagonal portion 31 for preventing rotation of the shaft. By virtue of the threaded connection between the spanner nut and the shaft, rotating the spanner nut relative to the shaft in a first direction causes relative axial movement between the shaft and the mounting bracket so that the roller and mounting bracket move toward each other. Since the roller is prevented from axial movement by its engagement with the guide 16, the net effect is that the ejector 17 is moved toward the floor 14 of the scraper bowl. Rotation of the spanner nut in the opposite direction results in moving the ejector away from the floor. Once the desired position is established, the spanner nut is again clamped against the mounting bracket by tightening the bolts 56.

For lateral adjustment of the ejector 17, the roller 21 is moved laterally relative to the mounting bracket 25 by first loosening the locking ring 54, as previously described, and rotating the spanner nut 48 and shaft 29 in unison. Since the shaft rotates about its longitudinal axis A, the axis B of the reduced diameter portions moves in a circle about the axis A resulting in lateral movement of the roller relative to the mounting bracket. To maintain the desired relationship between the groove 22 of the roller and the guide member 16, the rollers on both sides of the ejector are preferably adjusted at the same time.

In view of the foregoing, it is readily apparent that the structure of the present invention provides an improved roller mounting which provides both axial and lateral adjustment of the roller relative to the mounting bracket. Axial adjustment is provided by the threaded connection between the shaft and the spanner nut rotatable within the mounting bracket so that rotating the spanner nut relative to the shaft causes the shaft and the roller to move axially relative to the mounting bracket. Lateral adjustment of the roller is accomplished by mounting the roller on a radially offset reduced diameter portion of the shaft so that manual rotation of the shaft causes the reduced diameter portion and the roller to move in a circle about the axis of the shaft causing the roller to move laterally relative to the mounting bracket.

While the invention has been described and shown with particular reference to the preferred embodiment, it will be apparent that variations might be possible that would fall within the scope of the present invention which is not intended to be limited except as defined in the following claims.

What is claimed is:

1. A roller mounting providing independent axial and lateral adjustment of a roller, comprising:
    a mounting bracket having a bore extending therethrough;
    an elongated shaft extending into said bore of the mounting bracket and having opposite ends, a longitudinal axis, an eccentric portion formed on one of said ends having an axis radially offset from the longitudinal axis of the shaft, and a threaded portion formed on said other end of the shaft;
    a roller rotatably mounted on the eccentric portion of the shaft so that rotation of the shaft within the bore of the mounting bracket causes limited lateral movement of the roller relative to the mounting bracket;
    retaining means having a threaded bore extending therethrough screw threaded onto the threaded portion of the other end of the shaft so that rotation of the retaining means relative to the shaft and the mounting bracket causes the shaft to be selectively translated along its longitudinal axis for moving the roller axially relative to the mounting bracket; and
    means for releasably locking the retaining means to the mounting bracket, said locking means being independent of contact with the shaft so that the shaft may be positioned at any one of a variety of axially spaced positions with respect to the retaining means and mounting bracket when the retaining means is locked to the mounting bracket, said locking means being of a construction sufficient for permitting the retaining means to be rotated relative to the mounting bracket and independently of the shaft for moving the shaft axially to said any one position.

2. The roller mounting of claim 1 wherein said retaining means includes a spanner nut having an annular pilot portion rotatably disposed in the bore of the mounting bracket and a radially outwardly extending flange, and said locking means includes a locking ring having a recess formed therein to receive the flange of the spanner nut and a fastener to secure the locking ring to said mounting bracket for clamping said flange against the mounting bracket for preventing rotation of the spanner nut.

3. The roller mounting of claim 2 wherein said flange includes tool receiving means engageable with a tool to effect rotation of the spanner nut, said other end of said shaft includes tool receiving means formed thereon for engagement with a tool to selectively prevent rotation of the shaft while the spanner nut is rotated.

4. The roller mounting of claim 3 including an earthmoving scraper having a scraper bowl, an ejector reciprocatable within said scraper bowl, and a guide rail secured to the inside of said scraper bowl wherein said roller rides on said guide rail and said mounting bracket is secured to said ejector so that adjustment of the roller results in adjusting the position of the ejector relative to the scraper bowl.

* * * * *